United States Patent [19]

Nordlund

[11] Patent Number: 4,566,670

[45] Date of Patent: Jan. 28, 1986

[54] FLUID PRESSURE ACTUATOR HAVING POSITION SETTING MEANS

[75] Inventor: Sven Nordlund, Vällingby, Sweden

[73] Assignee: Wm Regele AB, Vällingby, Sweden

[21] Appl. No.: 653,270

[22] PCT Filed: Feb. 10, 1984

[86] PCT No.: PCT/SE84/00049

§ 371 Date: Sep. 19, 1984

§ 102(e) Date: Sep. 19, 1984

[87] PCT Pub. No.: WO84/03129

PCT Pub. Date: Aug. 16, 1984

[30] Foreign Application Priority Data

Feb. 11, 1983 [SE] Sweden ............ 8300757

[51] Int. Cl.[4] ............ F16K 21/04

[52] U.S. Cl. ............ 251/58; 251/288

[58] Field of Search ............ 251/58, 59, 60, 284–288; 92/138

[56] References Cited

U.S. PATENT DOCUMENTS

| | | | |
|---|---|---|---|
| 1,037,228 | 9/1912 | Fitts | 251/58 |
| 3,104,862 | 9/1963 | Pearson et al. | 251/58 |
| 3,107,080 | 10/1963 | Priese | 251/58 |
| 4,423,752 | 1/1984 | Psarouthakis | 251/288 |

*Primary Examiner*—James C. Yeung

*Attorney, Agent, or Firm*—Sughrue, Mion, Zinn, Macpeak & Seas

[57] ABSTRACT

A fluid pressure actuator (1) having two pistons (5,6) and a associated toothed rack portions (7,8) for activating an actuating member (10) via a toothed wheel (9) enables the piston positions to be adjusted, both in the full-strokes position of the actuating member (10) and in its zero-position. To this end, one end-wall (4) of the actuator has provided therein an adjusting screw (16) which engages the one piston (16). The piston, in turn, is provided with an adjusting screw (17) which engages the rack portion (7) of the opposing piston (5). This latter adjusting screw (17) can be reached through a plugged entry port (**4*d*) in the end-wall (4**).

3 Claims, 1 Drawing Figure

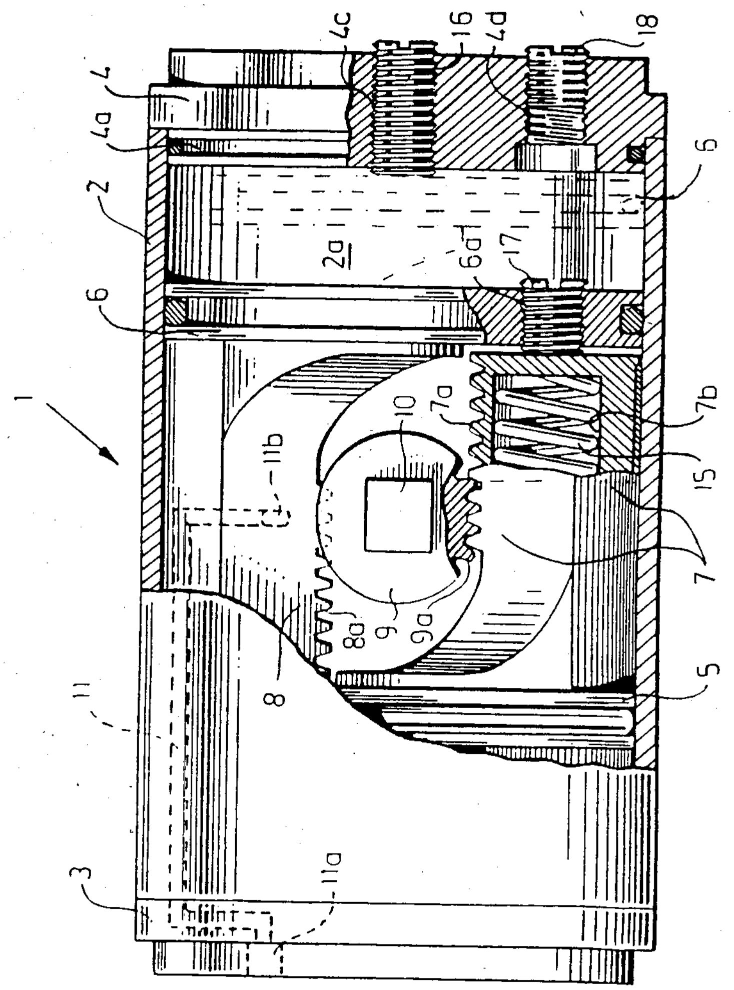
1
2
2a
3
4
4a
4c
4d
5
6
6a
7
7a
7b
8
8a
9
9a
10
11
11a
11b
15
16
17
18

FLUID PRESSURE ACTUATOR HAVING POSITION SETTING MEANS

FIELD OF INVENTION

The present invention relates to a fluid pressure actuator, e.g. for regulating valves, of the kind which includes a cylinder which is defined by end-walls and in which two pistons are arranged for movement towards and away from one another, said pistons having arranged thereon axially extending toothed rack portions the teeth of which mesh with a toothed wheel mounted on an actuating member which is journalled for rotation in and passes sealingly through at least one cylinder wall, so as to extend transversely to the longitudinal axes of said cylinders, and which further includes at least one passage for supplying pressure fluid to the cylinder space between the pistons.

BACKGROUND ART

Actuators of this kind are known through for instance EP A1 0 040 976 (Warnett) and U.S. Pat. No. 4,087,074 (Massey et al).

An actuator of this kind forms a compact and reliable unit for controlling various industrial processes and different kinds of apparatus.

Such an actuator is normally used to regulate valves, e.g. ball valves. In its simplest form, the actuator can, for example, rotate the actuating member through 90°, said member being connected to the valve slide, either directly or indirectly.

The actuating member can be rotated against the action of a spring, whereupon, if the fluid pressure is relieved, the pistons are returned to their zero-position by means of springs arranged in the rack portions.

The pistons, however, can also be returned to their zero-position under the influence of fluid pressure, either in addition to the springs or in place of said springs, whereupon the cylinder space between the end-walls of the actuator and respective pistons is placed under pressure via passages arranged in the cylinder wall and the end-walls, while de-pressurizing the space between the pistons.

It is often found subsequent to mounting the actuator, that the terminal positions of the pistons need adjusting, particularly when the actuator is to be used for regulating valves.

Hitherto, it has only been possible to adjust the outer terminal positions of the pistons, i.e. the positions in which the space between the pistons is under pressure and the pistons are located in the vicinity of their respective adjacent end-walls.

In this respect, it is possible to make such adjustments with known actuators by arranging in one of the end-walls of the actuator, preferably centrally of said wall, an adjusting means in the form of a screw, which projects away from said end-wall, into the cylinder chamber.

Thus, if the surface of the piston is located at a distance from the inner surface of the end-wall when said piston strikes against the screw, it is possible to adjust the stroke of the piston by turning the screw once or twice in one or the other direction. In practice, this normally corresponds to a 2°-3° rotation of the actuating member.

At present there is no possibility of making a similar adjustment when the pistons are located in their fully retracted position, corresponding to the zero-position of the actuating member.

OBJECT OF INVENTION

The possibility of making adjustments when the actuating member is in its zero-position, subsequent to mounting the actuator, is often desirable, particularly when regulating ball valves. The least little clearance in this position unavoidably results in the undesirable leakage of fluid, which can have extremely difficult consequences.

BRIEF DISCLOSURE OF THE INVENTION

The present invention affords a simple and reliable solution to the aforementioned problem. Accordingly, in its widest aspect the invention is mainly characterized in that one of the pistons is provided with means, e.g. a screw, which is arranged to engage the toothed rack portion of the other piston, so as to enable the pistons to be adjusted relative to one another in their fully retracted position. In this respect, the length of the rack portion on respective pistons is adjusted so that in the zero-position of the actuating member there is a clearance between the outer end surface of the rack portion and the inner end surface of the opposing piston, respectively.

The invention overcomes the prejudice that the pistons of an actuator of the kind mentioned should not be touched. No previous mention has been made of interfering with the pistons, presumably because of the risk of pressure fluid flowing over from that side of the piston which exhibits an overpressure in relation to the other side of the piston. It is possible, however, with the aid of present day sealing materials to arrange an adjusting device in the piston of the kind mentioned so that there is no risk of pressure fluid flowing between the two sides of the piston, despite the possibility of actuating the adjusting means with the aid of a screwdriver or like device.

An adjusting means of the aforementioned kind enables the zero-position of the actuating member to be adjusted between, for example, ±3°.

Consequently, an actuator according to the invention enables the actuating member to be adjusted both in its zero-position and its fully rotated position—for example corresponding to a 90° rotation of about ±3° or more.

In accordance with one embodiment of the invention preferred in practice, one end-wall of the actuator has arranged therein a closeable entry port arranged in line with the adjusting means, to enable activation of said means. The adjusting means is readily activated by introducing a screwdriver, or like tool, through said entry port and making the aforementioned adjustment in the zero-position of the actuating member. Thus, when making the adjustment it is not necessary to remove the end-wall.

BRIEF DESCRIPTION OF DRAWING

An embodiment of the invention will now be described in more detail with reference to the accompanying drawing, the single FIGURE of which is a partially cut-away side view of an actuator according to the invention, in a position corresponding to the zero-position of the actuating member. A full piston stroke is depicted in chain lines.

DESCRIPTION OF PREFERRED EMBODIMENT

In the drawing, the reference 1 identifies a fluid pressure actuator. Although an actuator of the described and illustrated kind is normally operated pneumatically, hydraulically operated actuators also fall within the scope of the invention.

The actuator includes a cylinder 2 having an inner cylinder chamber *2a*, which is defined at the ends thereof by end-walls 3, 4. As will be seen to the right of the FIGURE, the inner surface of the end-wall 4 is connected to a separate, sealed end portion *4a*. Two pistons 5, 6 are arranged in the chamber *2a* for movement towards and away from one another. Each of the pistons has arranged thereon an axially extending toothed rack portion 7 and 8, respectively, having respective teeth *7a* and *8a* which mesh with a toothed wheel mounted on an actuating member 10, which is journalled in two mutually opposite cylinder walls. For the purpose of supplying pressure fluid to the space between the pistons 5 and 6, there is provided a passage 11 having an orifice *11b*. The passage extends to a connection *11a* in the left-hand end-wall of the actuator.

The pistons are returned by means of thrust springs arranged in the rack portion of respective pistons. The thrust spring 15 accommodated in a bore *7a* in the rack portion 7 is illustrated in the FIGURE.

Alternatively, or in addition thereto, the pistons can be returned by supplying pressure fluid, via passages not shown, to the space between respective pistons 5, 6 and adjacent end-walls 3 and 4, respectively.

The end-wall 4 has arranged therein a central bore *4c* which accommodates an adjusting screw 16, which can be turned by means of a screwdriver. The adjusting screw 16 projects somewhat beyond the inner, sealed part *4a* of the end-wall 4. This enables the stroke position of the actuating member to be adjusted in the outer terminal positions of the pistons 5, 6, for example an adjustment corresponding to a 90°-rotation of said member.

Adjustment of the zero-position of the actuating member is made possible by means of an adjusting screw 17, which is accommodated in a bore *6a* in the piston 6. The adjusting screw 17 is arranged to engage the rack portion 7 of the opposing piston 5. Adjustments can be made, for example, up to ±3° for the actuating member 10.

The adjusting screw 17 can be reached through a bore *4d* in the end-wall 4. The bore is closed by means of a plug 18. The two adjusting screws 16, 17 and the plug 18, are provided with suitable sealing means.

Suitably, the adjusting screw 16 and the plug 18 are provided on the end-wall of the actuator which lacks means for connecting the actuator to a supply of pressure fluid.

An adjusting arrangement according to the invention can also be used in an actuator for, for example, 90° or 180°-rotation of the actuating member 10, where return of the pistons 5, 6 from a full stroke is effected by means of pressure fluid introduced to the cylinder space *2a* on both sides of respective pistons as an alternative to, or with the assistance of springs accommodated in the rack portions 7, 8, said pressure fluid being supplied through passages (not shown) having orifices (not shown) located in the end-walls 3 and 4, respectively. This will ensure that none of the passages interferes with any of the bores *4c* or *4d* accommodating the adjusting means 16 and the plug 18, respectively.

The invention can also be applied to modified embodiments of the lastmentioned actuator, in which one of the end-walls 3 or 4 has been removed and replaced with an auxiliary actuator means (not shown) provided with a piston and associated piston rod, which projects into the cylinder chamber *2a*. It is possible with the aid of such an auxiliary device to rotate the actuating member 10 stepwise between a plurality of distinct positions, for example corresponding to 0°, 90° and 180°-rotation thereof.

I claim:

1. A fluid pressure actuator comprising:

a cylinder (2) having axially disposed end walls (3, 4), at least one side wall, and an inner chamber (*2a*) bounded longitudinally by said end walls and transversely by said at least one side wall;

first and second pistons (5, 6) located in said inner chamber, said pistons being simultaneously movable in opposite directions along the longitudinal axis of said cylinder in response to fluid pressure introduced into said inner chamber, each of said pistons having a toothed rack portion (7, 8) extending longitudinally toward the interior of the inner chamber;

a toothed wheel (9) having teeth which mesh with the teeth of said toothed rack portions, said toothed wheel being mounted on an actuating member (10) journaled for rotation in a side wall of said cylinder 2;

at least one fluid passage (11) for supplying pressure fluid to said inner chamber (*2a*) between said two pistons to thereby extend said pistons to their respective outer terminal positions;

means for causing said pistons to retract to their fully retracted, zero-position upon release of said pressure fluid from between said two pistons;

first adjusting means (16) passing through at least one of said end walls such that it projects past the end wall into the inner chamber while being accessible from the exterior of the cylinder, for adjusting the maximum outer terminal positions of said pistons;

second adjusting means (17), passing through one of said pistons such that it projects into the inner chamber between said two pistons and into engagement with the toothed rack portion of the other of said pistons, while being accessible from that portion of the inner chamber between said one piston and its juxtaposed end wall, for adjusting the relative positions of said pistons in their fully retracted, zero-position; and means in the end wall juxtaposed to said one piston for providing access to said second adjusting means without removal of said juxtaposed end wall.

2. The actuator as claimed in claim 1, wherein said means for providing access is a sealable entry port (*4d*) in longitudinal registration with said second adjusting means (17).

3. The actuator as claimed in claim 2, wherein said first and second adjusting means are screws.

* * * * *

UNITED STATES PATENT AND TRADEMARK OFFICE

CERTIFICATE OF CORRECTION

PATENT NO. : 4,566,670

DATED : January 28, 1986

INVENTOR(S) : Sven NORDLUND

It is certified that error appears in the above-identified patent and that said Letters Patent is hereby corrected as shown below:

Title page:

[73] Assignee: Wm Regele AB, Vallingby, Sweden should read...

--[73] Assignee: WM Regler AB, Vallingby, Sweden--

Signed and Sealed this

*Twenty-sixth* Day of *August 1986*

[SEAL]

*Attest:*

DONALD J. QUIGG

*Attesting Officer* *Commissioner of Patents and Trademarks*